Figure 1:
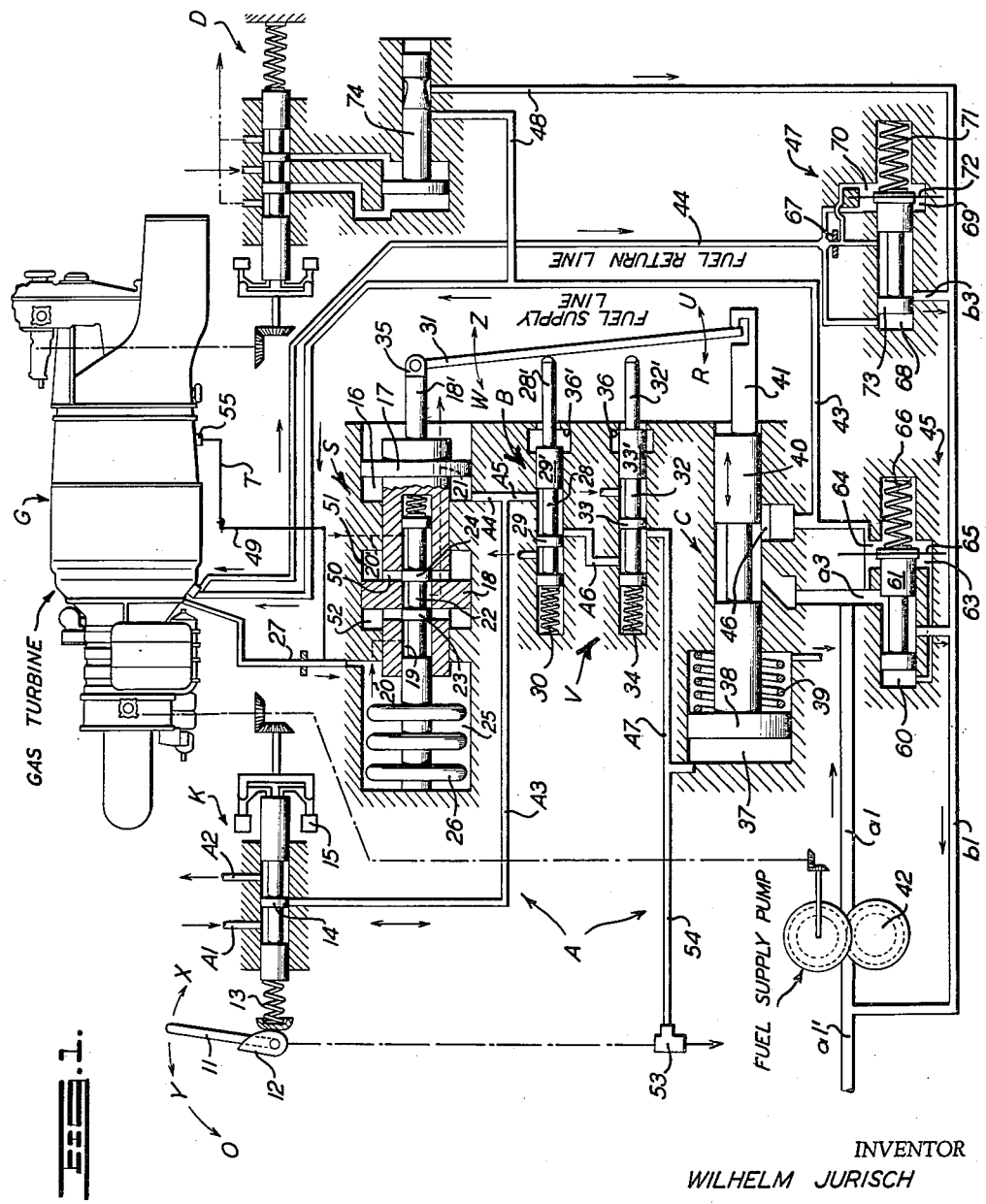

United States Patent Office 3,064,421
Patented Nov. 20, 1962

3,064,421
FUEL CONTROL SYSTEM
Wilhelm Jurisch, Stuttgart-Sillenbuch, Germany, assignor to Daimler-Benz Aktiengesellschaft, Stuttgart-Untertürkheim, Germany
Filed Apr. 19, 1960, Ser. No. 23,330
Claims priority, application Germany Apr. 24, 1959
13 Claims. (Cl. 60—39.28)

The present invention relates to an installation for controlling the fuel quantity for gas turbine drive units consisting essentially of a hydraulically actuated fuel control member or fuel metering device which meters the fuel quantity flowing under pressure to the burner system, of an actuating installation provided with a speed-responsive control member which receives a control signal, for example, with the aid of an actuating lever and thereby energizes simultaneously the drive or actuation for the displacement of the fuel metering device over a hydraulic control circuit for such length of time until the control countermanding-signal derived from the speed-responsive control member again interrupts the hydraulic drive and thereby effectuates standstill of the fuel metering device in the then prevailing position thereof, of a device operative in dependence on a compressor magnitude, especially on the compressor end or output pressure with limiting means which together influence the execution of the aforementioned control signal and therewith the adjustment of the fuel metering device in such a manner that it is impossible to exceed or drop below the fuel quantity corresponding to the maximum permissive and lowest fuel quantity, respectively, for the drive unit over the entire adjustment range thereof.

Somewhat similar control installations which operate approximately according to the control system described hereinabove are known per se in the prior art. However, in order to remain within the upper and lower boundary lines illustrated by curves $r$ and $s$ in the diagrams of FIGURES 2 and 3 which will be referred to more specifically hereinafter, during acceleration and deceleration of the drive unit, purely mechanically-operated adjusting mechanisms are known in the prior art. Such known mechanisms are driven in dependence on the compressor and pressure $p_2$ and form abutments for an actuating member driving the fuel metering piston.

In these prior art devices, the distances of the two limit abutments increase with respect to each other during operation with an increasing end pressure $p_2$. The respective prevailing positions of the two end abutments or limit members of the prior art are thereby so constructed as to correspond to or approximate the lines $r$ and $s$ in FIGURES 2 and 3 composed of a very large number of individual points.

In connection with the known installations of the prior art, there arises the disadvantageous circumstance that the purely mechanically constructed abutment installation which is hydraulically driven in dependence on the pressure $p_2$ over a servo-mechanism has to be moved against or in opposition to the fuel control or fuel metering installation which is also driven or actuated over a hydraulically driven working piston, i.e., the servo-installations operative in dependence on the compressor end pressure $p_2$ and the fuel metering installation operate against one another as regards the respective forces thereof. This is so because the servo-installation operative in dependence on the compressor pressure $p_2$ exerts during accelerations and decelerations a "braking" effect on the drive arrangement for the fuel metering installation in order to permit the adjusting operation to proceed in accordance with the boundary lines $r$ and $s$.

The mutual interplay of the forces directed against each other requires, in addition to a relatively high, non-useful force input, a more sturdy dimensioning of the individual working members and operating parts, and therewith a relatively heavy construction of the overall installation. Furthermore, during the run-in period in the test stand, an adjustment in the abutment arrangement for purposes of effectively changing the slope of the two boundary lines $r$ and $s$ for obtaining optimum conditions during operation of the drive unit is not possible with these prior art devices.

In order to eliminate the aforementioned disadvantages of the prior art, it is proposed in accordance with the present invention to arrange the limit installation provided for purposes of metering the fuel quantity along an upper and lower limit or boundary line, within the hydraulic control circulatory system itself and ahead of the hydraulic drive or actuating means actuating the fuel metering member whereby the limit installation acts directly on the hydraulic control circulatory system.

Furthermore, it is proposed in accordance with the present invention to construct the limit installation as two separately-constructed, individual units, and more particularly of an installation or unit for limiting a respective permissive fuel quantity during accelerations and of an installation or unit for limiting a respective minimum fuel quantity during decelerations.

Furthermore, it is additionally proposed in accordance with the present invention to operatively connect or couple with each other the adjusting mechanism operative in dependence on the compressor end pressure $p_2$ and the fuel metering member or the installation driving the same by means of an adjusting member which, in turn, forms an abutment for the limit installation or actuates the same.

Accordingly, it is an object of the present invention to provide a fuel control system for gas turbine drive units which obviates the disadvantages of the prior art devices.

It is still another object of the present invention to provide a fuel adjusting control mechanism for a gas turbine drive unit which is simple in construction, reliable in operation and extremely effective to maintain the fuel metering adjustment between given predetermined maximum and minimum limits to assure proper operation of the gas turbine drive unit at all times.

Still another object of the present invention resides in the provision of a fuel metering system selectively adjustable in such a manner as to permit adjustment of the maximum and minimum fuel quantities supplied to the gas turbine drive unit under different pressure conditions in order to permit adjustment of the characteristics of the fuel metering system for optimum operation of the gas turbine unit.

Still another object of the present invention resides in the provision of a fuel metering system for gas turbine drive units in which the maximum and minimum limits of fuel quantities to be supplied to the gas turbine unit are controlled at least in part by means of a hydraulic system which offers great versatility in the operation thereof without complicated and cumbersome mechanical parts.

Another object of the present invention resides in the provision of a fuel metering system adjustable automatically in dependence on certain conditions which is relatively light weight without impairing proper operation thereof notwithstanding its simplicity and low requirements for the total number of mechanically movable parts.

Figure 2:
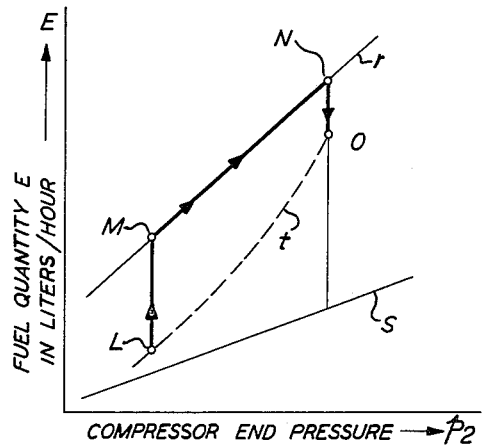
Figure 3:
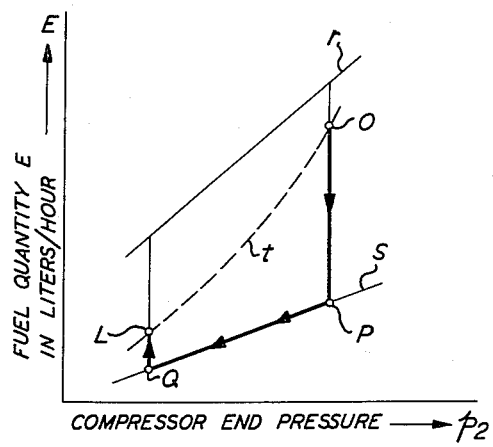

These and other objects, features and advantages of the present invention will become more obvious from the following description, when taken in connection with the accompanying drawing which shows, for purposes of illustration only, one embodiment in accordance with the present invention and wherein:

FIGURE 1 is an overall partly diagrammatic, schematic view of the control installation for a gas turbine unit in accordance with the present invention, and FIGURES 2 and 3 are diagrams representative of the operation of the control installation of FIGURE 1.

Referring now to the drawing, and more particularly to FIGURE 1, the control installation in accordance with the present invention comprises, in addition to the gas turbine drive unit generally designated by reference character G, the following main units, namely, a selective, manually adjustable control mechanism generally designated by reference character K, a servo-motor generally designated by reference character S operating in dependence on the compressor end or outlet pressure, an acceleration limit installation generally designated by reference character B, a deceleration limit installation generally designated by reference character V, a fuel control or metering installation generally designated by reference character C, and a speed-responsive control member generally designated by reference character D provided for the output-producing turbine which is mechanically separate from the gas producer unit.

The principal units of the control system in accordance with the present invention will now be individually described in detail.

The selective control mechanism generally designated by reference character K consists of an actuating lever 11 by means of which the airplane pilot actuates a cam 12. The cam 12 in turn is in operative engagement with a spring 13 to vary the spring force thereof, while spring 13 is operative in turn to spring-load control piston 14. On the other hand, flyweights 15 driven from the drive unit G act also on the control piston 14. The piston 14 controls thereby a hydraulic circulatory system generally designated by reference character A at a place at which this system branches off, namely into a pressure oil input line A1 and an essentially pressureless return or discharge line A2.

The section A3 of the hydraulic control line system A leading away from control mechanism K is bifurcated in turn at the end thereof into a line portion A4 and into a line portion A5. The line portion A4 leads to a pressure oil supply reservoir or chamber 16 the function of which will be described more fully hereinafter. The chamber 16, in turn, is closed off by means of a displacement piston 17 which forms a part of the servomotor S constituted in the form of a follow-up piston arrangement. Reference numeral 18 thereby designates the working piston of this follow-up piston assembly. A spool-type slide member 22 provided with two control pistons 23 and 24 slides within a central bore 19 provided in the working piston 18 into which discharge schematically-indicated pressure inlet lines 20 and 20' and from which leads away a schematically-indicated return or discharge line 21, for instance, to the sump; since the admission and discharge through lines 20, 20' and 21 takes place in any suitable, conventional manner, these lines are indicated in FIGURE 1 only schematically for clarity's sake. The slide member 22 is displaced by means of a pressure box or cell assembly 26 accommodated within an enclosed chamber 25 whereby the arrangement thereof is such that the compressor end pressure $p_2$ acts on the pressure cells 26. For that purpose, the chamber 25 is in communication over a pipe, line, conduit 27 or the like with the drive unit G in such a manner as to apply to chamber 25 a pressure proportional or equal to the compressor pressure, preferably the end pressure thereof.

The line portion A5 of the control line system A leads to an acceleration limit installation B which consists of a spool-type slide member 28 provided with control pistons 29 and 29', with a return spring 30, and with an abutment pin member 28' which abuts against an adjusting member 31 one end of which is pivotally secured in any suitable manner at 35 on the servo-mechanism S. The outermost position of the slide member 28, i.e., the extreme right end position thereof as viewed in FIGURE 1 is limited thereby by a stationary abutment 36', for instance, formed within the housing of the control system.

A further line section A6 of the control line system A leads from the acceleration limit installation B to a deceleration limit installation V which also consists essentially of a spool-type slide member 32 provided with control pistons 33 and 33', with a return spring 34, and with an abutment pin member 32' which at times is actuated by the adjusting member 31 as will appear more fully hereinafter. The outermost position of the slide member 32, i.e., the extreme right end position thereof as viewed in FIGURE 1, is also limited by a stationary abutment 36.

A further line section A7 of the control line system A extends between the deceleration limit installation V and the fuel metering installation C. The line section A7 thereby terminates in a chamber 37 which is closed off, on the one hand, by a working piston 38 spring-loaded by means of spring 39. The working piston 38 actuates a fuel metering piston 40 which in turn is extended outwardly in the form of a rod 41 or the like on which the other end of adjustment member 31 is pivotally secured in any suitable manner.

The fuel system consists essentially of a fuel supply pump 42 which produces the injection pressure and to which are connected to the output line $a1$ and input line $a1'$, of a fuel supply line 43 which leads from the fuel metering installation C to the injection nozzles (not shown) of the combustion chamber or chambers of the drive unit G, and of a fuel return line 44 leading from the drive unit G to a differential pressure control mechanism generally designated by reference numeral 47. As schematically illustrated in FIGURE 1, the quantity of fuel supplied by pump 42 may be varied in dependence upon the rotational speed of the drive unit G. A differential pressure control mechanism generally designated by reference numeral 45 is built into the fuel supply line 43 by means of which the pressure difference ahead of and behind the metering slot 46 which is controlled by means of piston 40 is kept constant. The control slot 46 may thereby be of any suitable configuration, for example, as shown in FIGURE 4 of my copending application Ser. No. 23,331, filed of even date herewith and entitled "Fuel System For Gas Turbines." The other differential pressure control member 47 assures thereby a constant fuel return quantity as more fully described in the aforementioned copending application the subject matter of which is incorporated herein by reference insofar as necessary. Briefly, the control valve 47 includes a throttling section or constriction 67 which may be of adjustable construction which is installed in the return line 44 ahead of the valve 47 in order to produce a pressure differential. A higher pressure thereby exists in the chambers 68 and 69 in communication with the upstream side of the throttling section 67, and a lower pressure is present on the other side, namely in chamber 70, which lower pressure is effectively aided by spring 71. Chambers 69 and 70 are separated by a membrane or diaphragm 72. A control piston 73 associated with diaphragm 72 effectively valves the return line section $b3$. For example, during acceleration in which a larger amount of fuel will be flowing through the fuel supply line 43 and similarly in the return line 44, the control piston 73 will be displaced toward the right by the increased pressure of the increased fuel flow thereby producing a throttling of the return line $b3$ to maintain the fuel return quantity constant.

Additionally, a rotational speed limit control device D is provided which, upon exceeding a certain rotational speed in the drive unit G, and more particularly in the output-producing turbine thereof, controls a part of the fuel over a by-pass line system 48 branching off from the fuel supply line 43 and leading to the return line $b1$ of the fuel system while by-passing the differential pressure controller.

Furthermore, an installation generally designated by reference character T is provided in the control system according to the present invention which effectively limits the maximum permissive temperature for the drive unit G. For that purpose, a branch line 49 is provided which is in communication with connecting line 27. When the maximum permissive temperature is exceeded within the drive unit G, the pressure $p_2$ within chamber 25 is correspondingly reduced by means of a temperature sensitive device 55 of any suitable conventional construction which in turn opens a valve (not shown) in any suitable manner so that a reduction in the fuel injection quantity follows therefrom.

*Operation*

The operation of the control installation in accordance with the present invention is as follows:

A stationary condition of the drive unit G is assumed for purposes of the present discussion as the starting point or initial condition thereof. In this condition, the two control pistons 29 and 33 of the acceleration and deceleration limit installations B and V, respectively, thereby open up the control oil circulatory system A by providing a communication between line sections A5, A6 and A7 whereas the control piston 14 of the control installation K is in the center position thereof corresponding to the particular position thereof as shown in FIGURE 1 of the drawing.

This initial condition corresponds to the point L shown in the diagram of FIGURES 2 and 3. In these diagrams, the compressor end pressure $p_2$ is plotted along the abscissa thereof whereas the fuel quantity E in liters per hour is plotted along the ordinate thereof. The line or curve $r$ in FIGURES 2 and 3 indicates the upper limit of the operating range plotted against the pressure $p_2$, while line or curve $s$ represents the lowermost limit of the fuel quantity below which the drive unit would stall, i.e., the combustion chamber would become extinguished. The dash line curve $t$ in FIGURES 2 and 3 represents a characteristic line of the drive unit G corresponding to a predetermined flight condition.

At first, the operations will be described which occur during acceleration of the drive unit G.

For that purpose, the pilot adjusts the actuating lever 11 in the direction of arrow X. The spring 13 is thereby compressed and moves the control piston 14 toward the right as viewed in FIGURE 1 whereby the pressure-oil input line A1 is placed into communication with the control line section A3. The pressurized oil thereby flows from line section A3 through line sections A5, A6 and A7 and reaches chamber 37 whereby the working piston 38 and therewith the fuel metering piston 40 are displaced by the oil pressure toward the right as viewed in FIGURE 1 so that the metering slot 46 is opened up a larger amount and more fuel is permitted to reach the injection nozzles over supply line 43. The fuel control piston 40 thereby moves toward the right for such length of time until the adjusting lever 31 which under those circumstances pivots in the direction of arrow U assumes such a position that the control piston 29 of the acceleration limit installation B closes off the line section A6. This corresponds to the point M in the diagram of FIGURE 2.

In the meantime, the rotational speed of the drive unit G has increased by reason of the increase of the injection quantity which simultaneously means, in practice, an increase in the compressor end pressure $p_2$. This in turn brings about a compression or reduction in lengths of the barometric cell assembly 26 and therewith an adjustment of the control slide member 22 toward the left as viewed in FIGURE 1.

As a result thereof, the control piston 24 opens up the transverse bore 50 provided in the follow-up piston assembly 18, 21 so that oil under pressure supplied through line 20' is permitted to flow into the space 51 and thereby loads or acts on the right-hand side of servo-piston 18 to displace the same toward the left as viewed in FIGURE 1. In the course of the ensuing displacement of the working piston 18, the pressure oil present in space 52 is forcibly displaced and is discharged therefrom through the return line 21. The operation of the follow-up piston assembly described hereinabove takes place for such length of time as there is any change or increase in the pressure $p_2$. The control piston 29 of the acceleration limit installation B is thereby displaced toward the left, actuated by the adjusting member 31 which itself pivots in the direction of arrow W due to the movement of the pivot point 35 thereof on the extension 18' toward the left as viewed in FIGURE 1 so that the control oil under pressure is permitted to flow into chamber 37 and thereby is able to actuate the working piston 38 of the fuel metering installation C.

The last-described operation takes place by reason of the geometric dimensioning and relations of the individual installations and operating members thereof with respect to each other in such a manner that a fuel increase in dependence on the compressor end pressure $p_2$ is obtained that follows limit line $r$ (FIGURE 2) until the point N thereof is reached. In addition to the constant quantity of pressure oil flowing normally through the control line section A3, an additional quantity of pressure oil is displaced from the space 16 of the servo-motor installation S by piston 17 and is forced into the line section A5 so that the working piston 38 and therewith the fuel metering piston 40 is moved more rapidly toward the right whereby the fuel increase in dependence on the compressor end pressure $p_2$ takes place progressively. This is so because the compressor end pressure $p_2$ increases along an exponential curve, as is well known.

Upon attaining the point N in the diagram of FIGURE 2, the control installation K reaches equilibrium, i.e., the opposing forces of the flyweights 15 and of the spring force of spring 13 becomes equal so that the control piston 14 reaches the neutral center position thereof and thereby effectively returns the excess fuel quantity still present for purposes of acceleration from the points N to O as illustrated in FIGURE 2. The foregoing may be explained as follows:

The reduction of the fuel quantity during the accelerating operation from point N to point O is the result of the inherent operation of the speed-responsive device 15. After the pilot has pivoted the lever 11 in the direction X, the control piston 14 is displaced toward the right as mentioned hereinabove so that pressure oil from line A1 is permitted to flow into the line A3, as also described hereinabove, thereby initiating the control operation, fully explained hereinabove. As soon as the desired, preselected speed is attained, the speed-responsive flyweights 15 become operative and displace the piston 14 toward the left as viewed in FIGURE 1 of the drawing. However, this movement or displacement of the control piston 14 cannot be brought to a standstill, for reasons of inertia, exactly at the moment when the control piston 14 is disposed accurately over the control bore of the line A3. Instead, the control piston 14 slightly moves beyond this bore so that a slight amount of pressure oil is forced back into the line A2 from line A3 by means of the piston 38 subjected to the force of the spring 39 whereupon in effect a smaller quantity of fuel (O) is discharged or flows off through the metering slot 46 into line 43 than immediately prior thereto (N).

A condition of equilibrium then is eventually reached in the position O, i.e., the system is completely quiescent and the piston 14 is disposed exactly over the control bore of line A3.

The slight oscillating movement mentioned hereinabove is desirable in order to control the installation pursuant to the diagrams of FIGURES 2 and 3, i.e., to approach the line $t$ representing the ideal conditions from above from line $r$ during the acceleration, and from below from line $s$ during deceleration. In reality, of course, the transition does not form an acute angle as shown in the drawing but, in fact, will follow a somewhat more rounded-off path.

In order to decrease the output of the drive unit G, the pilot pivots the actuating lever or stick 11 in the direction of arrow Y. As a result thereof, the spring force of spring 13 is reduced. The control piston 14 thereupon moves toward the left, as viewed in FIGURE 1, whereby the control line section A3 is placed into communication with the return line or discharge line A2. The working piston 38 of the fuel-metering installation C is thereby forced toward the left by the force of spring 39 and the oil present in chamber 37 is displaced thereby into line sections A7, A6, A5 and A3. Simultaneously therewith, the fuel metering piston 40 is taken along toward the left so that the fuel quantity supplied to the injection nozzles (not shown) from pump 42 through lines $a1$ and supply line 43 is reduced. The extension rod 41 thereby takes along the adjusting lever 31 in the direction of arrow R which adjusting lever 31 thereby abuts against the rod 32' of the slide member 32 and thereby displaces the control piston 33 of the deceleration limit installation V toward the left until the latter finally closes off the control line section A7. As viewed from the diagram in FIGURE 3, the condition achieved thereby corresponds to the point P located along the lower limit line $s$. In the meantime, the compressor end pressure $p_2$ has also dropped by reason of a decrease in the rotational speed of the drive unit. This in turn produces an expansion of the pressure cell assembly 26 and therewith a displacement of the pivot point 35 on the follow-up piston assembly toward the right. Consequently, the adjusting lever 31 pivots in the direction of arrow Z whereby the slide member 32 of the deceleration limit installation V may move toward the right so that the line A7 is again opened. As a result thereof, the force of spring 39 may now become effective again. The fuel metering piston 40 thereupon moves toward the left and thereby further reduces the metering slot 46. The last-described operation takes place for such length of time until the point Q in diagram of FIGURE 3 is reached. This point Q corresponds to the preselected relatively low rotational speed. The control installation K now establishes the stationary operating condition corresponding to the point L in the diagram of FIGURE 3.

In case the maximum permissive temperature is exceeded within the drive unit G, a temperature limiting installation T is provided which consists essentially of a conventional temperature-sensing device constructed and operative in such a manner, according to well known principles, as to open up a suitable valve of any known construction (not shown) when the maximum permissive temperature is exceeded which, in turn, thereby reduces the effective compressor end pressure $p_2$ in the chamber 25 over line 49 so that the increase of the fuel quantity is delayed under those operating conditions during acceleration of the drive unit G.

This temperature-responsive installation T is also effective during stationary operation in the full-load range during corresponding flight conditions. If the maximum temperature limit is exceeded, then the air valve (not shown) is opened by the temperature-sensing device 55 so that the pivot point 35 of the servo-motor installation S is displaced toward the right as explained hereinabove. As a result thereof, the control line section A6 is valved by the control piston assembly 28, 29 following the pivotal movement of adjusting member 31 in the direction Z and thereby permits the oil under pressure to flow off from chamber 37 through line A6 to the discharge line in the acceleration limit installation B, whereby the fuel quantity is reduced due to throttling of slot 46 by piston 40 and the rotational speed of the drive unit G falls below the rotational speed preselected by the adjustment or setting of the control installation K. As long as this flight condition remains, the control piston assembly 28, 29 takes over the control of the injection fuel quantity corresponding to the limit value prescribed by the temperature-sensing member 55.

A stop valve 53 (FIGURE 1) of conventional construction is provided for purposes of turning off the drive unit G which is connected with a branch line 54 which leads from the line section A7 to the sump or discharge of the oil system and is mechanically or otherwise coupled for actuation thereof with lever 11 or cam 12. If the actuating member 11 is placed into the O-position thereof indicated only schematically in FIGURE 1 of the drawing, then the stop valve 53 is opened whereby the pressure oil present in chamber 37 flows off into the discharge over line 54 so that the fuel metering piston 40 is permitted to move toward the left and thereby shuts off the drive unit G by completely closing off the fuel supply line 43.

While I have shown and described one embodiment in accordance with the present invention it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:
1. A control system for controlling the fuel quantity supplied to a gas turbine drive unit having compressor means, comprising hydraulic control circuit means providing an actuating fluid medium under pressure, hydraulically actuated fuel control means cooperatively connected with said hydraulic control circuit means and selectively actuated by the fluid medium thereof for adjustably metering the fuel quantity flowing to the gas turbine drive unit, selective control means operatively connected with said control circuit means and including speed-responsive means operative in dependence on the rotational speed of said drive unit for selectively rendering said hydraulic control circuit means effective to actuate said fuel control means by said fluid medium until said speed-responsive means renders the same inoperative again, and limit means operatively connected with said control circuit means for influencing actuation of said fuel control means by said fluid medium to maintain predetermined maxima and minima fuel quantities to said gas turbine drive unit during acceleration and deceleration, respectively, said limit means including pressure-responsive means and first and second means including piston means within said hydraulic control circuit means ahead of said fuel control means, said first and second means being effective to temporarily block the flow of said fluid medium to said fuel control means upon the attainment of a maximum permissible fuel quantity during acceleration or of a minimum permissible fuel quantity during deceleration, respectively, said pressure-responsive means operating in conjunction with the position of the fuel control means and being effective in dependence on predetermined values measured at said compressor means and said position of said fuel control means to override the blocking of said first or second means to resume flow of said fluid medium to said fuel control means.

2. A control system according to claim 1, wherein said pressure responsive means is operative in dependence on the outlet pressure of said compressor means.

3. A control system according to claim 1, further comprising means forming a fuel supply and return system controlled by said fuel control means and including means for controlling a return flow of the fuel from said drive unit so as to be essentially constant over the entire operating range thereof.

4. A control system for controlling the fuel quantity supplied to a gas turbine drive unit having compressor means comprising hydraulic control circuit means providing a fluid medium under pressure and including servo means having a control piston, hydraulically actuated fuel control means operatively connected with said hydraulic control circuit means and selectively actuated by the fluid medium thereof for adjustably metering the fuel quantity flowing to the gas turbine drive unit, selective control means operatively connected with said control circuit means and including speed-responsive means operative in dependence on the rotational speed of said drive unit for selectively rendering said hydraulic control circuit means effective to actuate said fuel control means by said fluid medium until said speed-responsive means renders the same inoperative again, limit means for influencing actuation of said fuel control means, said limit means including first and second means within said hydraulic control circuit means ahead of said fuel control means, said first and second means being effective to temporarily block the flow of said fluid medium to said fuel control means upon the attainment of a maximum permissible quantity during acceleration or of a minimum permissible fuel quantity during deceleration, respectively, pressure-responsive means operatively associated with said compressor means for adjustably controlling said control piston of said servo means in dependence upon predetermined pressure values to override the blocking of said first or second means and to permit additional flow of fluid medium to said fuel control means, and an adjusting member operatively connecting said fuel control means with said servo means and simultaneously constituting abutments for said first and second means.

5. A control system for controlling the fuel quantity supplied to a gas turbine drive unit having compressor means comprising hydraulic control circuit means providing a fluid medium under pressure and including servo means having a control piston, hydraulically actuated fuel control means operatively connected with said hydraulic control circuit means and selectively actuated by the fluid medium thereof for adjustably metering the fuel quantity flowing to the gas turbine drive unit, selective control means operatively connected with said control circuit means and including speed-responsive means operative in dependence on the rotational speed of said drive unit for selectively rendering said hydraulic control circuit means effective to actuate said fuel control means by said fluid medium until said speed-responsive means renders the same inoperative again, pressure-responsive means responsive to the outlet pressure of said compressor means for adjustably controlling said control piston of said servo means in dependence on said outlet pressure, limit means operatively connected in said hydraulic control circuit means for influencing actuation of said fuel control means by said fluid medium to maintain predetermined maxima and minima fuel quantities supplied to said gas turbine drive unit, and an adjusting member operatively connecting said fuel control means with said servo means, said limit means including first and second valving piston members effective during acceleration and deceleration, respectively, and each provided with a push rod so arranged in relation to said adjusting member as to be adapted to abut thereagainst in certain positions of the respective valving piston member, at least the push rod of said second member being normally spaced from said adjusting member, said adjusting member simultaneously constituting abutments for said limit means.

6. A control system according to claim 5, further comprising spring means for pretensioning each of said valving piston members of said limit means in the direction toward said adjusting member.

7. A control system according to claim 6, further comprising a housing for said system, wherein the piston strokes of said valving piston members of said limit means are limited in the direction toward said adjusting member by abutments secured to said housing.

8. A control system according to claim 5, further comprising stop-valve means, and said fuel control means including working piston means, a branch line operatively connecting said stop-valve means with said control circuit means at a point thereof between said working piston means of said fuel control means and said limit means, and means operatively connecting said stop-valve means with said selective control means to open said stop-valve means upon movement of said selective control means into the stop position thereof.

9. A control system for controlling the fuel quantity supplied to a gas turbine drive unit having compressor means comprising hydraulic control circuit means providing a fluid medium under pressure and including servo means having a control piston, hydraulically actuated fuel control means operatively connected with said hydraulic control circuit means and selectively actuated by the fluid medium thereof for adjustably metering the fuel quantity flowing to the gas turbine drive unit, selective control means operatively connected with said control circuit means and including speed-responsive means operative in dependence on the rational speed of said drive unit for selectively rendering said hydraulic control circuit means effective to actuate said fuel control means by said fluid medium until said speed-responsive means renders the same inoperative again, pressure-responsive means responsive to the outlet pressure of said compressor means for adjustably controlling said control piston of said servo means in dependence on said outlet pressure, limit means operatively connected in said hydraulic control circuit means for influencing actuation of said fuel control means by said fluid medium to maintain predetermined maxima and minima fuel quantities supplied to said gas turbine drive unit, and an adjusting member operatively connecting said fuel control means with said servo means and simultaneously constituting abutments for said limit means, said servo means including a follow-up piston assembly constituting said control piston and provided with an extension, said fuel control means including a valving piston member also provided with an extension, said adjusting member including a lever pivotally secured near one end thereof at one of said extensions and pivotally secured near the other end thereof at the other of said extensions.

10. A control system for controlling the fuel quantity supplied to a gas turbine drive unit having compressor means comprising hydraulic control circuit means providing a fluid medium under pressure and including servo means having a control piston, hydraulically actuated fuel control means operatively connected with said hydraulic control circuit means and selectively actuated by the fluid medium thereof for adjustably metering the fuel quantity flowing to the gas turbine drive unit, selective control means operatively connected with said control circuit means and including speed-responsive means operative in dependence on the rotational speed of said drive unit for selectively rendering said hydraulic control circuit means effective to actuate said fuel control means by said fluid medium until said speed-responsive means renders the same inoperative again, pressure-responsive means responsive to the outlet pressure of said compressor means for adjustably controlling said control piston of said servo means in dependence on said outlet pressure, limit means operatively connected in said hydraulic control circuit means for influencing actuation of said fuel control means by said fluid medium to maintain predetermined maxima and minima fuel quantities supplied to said gas turbine drive unit, and an adjusting member operatively connecting said fuel control means with said servo means and simultaneously constituting abutments for said limit means, reservoir means within said hydraulic control circuit means for storing therein fluid medium under pressure, and means for filling said reservoir means during decelerations of said drive unit and for alternately releasing the stored fluid medium under pressure during accelerations of said drive unit in dependence on changes in said compressor outlet pressure.

11. A control system according to claim 10, wherein said servo means includes a housing and wherein said reservoir means is accommodated within said housing, said servo means including a displacement piston driven by a follow-up piston, and wherein said reservoir is limited on one side thereof by said displacement piston.

12. A control system for controlling the fuel quantity supplied to a gas turbine drive unit according to claim 10, further comprising temperature responsive control means for limiting the amount of fuel supplied to said drive unit by said limit means when said drive unit exceeds a predetermined temperature.

13. A control system according to claim 10, further comprising means forming a fuel supply and return system controlled by said fuel control means and including means for controlling a return flow of the fuel from said drive unit so as to be essentially constant over the entire operating range thereof.

References Cited in the file of this patent

UNITED STATES PATENTS

| | | |
|---|---|---|
| 2,673,556 | Reggio | Mar. 30, 1954 |
| 2,737,015 | Wright | Mar. 6, 1956 |
| 2,738,003 | Carey | Mar. 13, 1956 |
| 2,879,643 | Stroh et al. | Mar. 31, 1959 |
| 2,988,875 | Farkas | June 30, 1961 |

FOREIGN PATENTS

| | | |
|---|---|---|
| 695,283 | Great Britain | Aug. 5, 1953 |
| 784,690 | Great Britain | Oct. 16, 1957 |